United States Patent
Brook et al.

(10) Patent No.: US 7,356,996 B2
(45) Date of Patent: Apr. 15, 2008

(54) APPARATUS AND METHOD FOR HOLDING A CRYOGENIC FLUID AND REMOVING CRYOGENIC FLUID THEREFROM WITH REDUCED HEAT LEAK

(75) Inventors: Thomas Brook, Shawnigan Lake (CA); Gregory C. Harper, Vancouver (CA); Valeria-Nadia LeBlanc, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/426,308

(22) Filed: Jun. 24, 2006

(65) Prior Publication Data

US 2007/0000259 A1   Jan. 4, 2007

Related U.S. Application Data

(63) Continuation of application No. PCT/CA2004/002166, filed on Dec. 20, 2004.

(30) Foreign Application Priority Data

Dec. 24, 2003   (CA) .................................... 2454458

(51) Int. Cl.
*F17C 13/00* (2006.01)
*F17C 13/08* (2006.01)

(52) U.S. Cl. .......................... 62/50.6; 62/53.2; 417/901

(58) Field of Classification Search ................ 62/50.6, 62/53.2, 7; 417/901
See application file for complete search history.

(56) References Cited

U.S. PATENT DOCUMENTS 4,593,835 A * 6/1986 Kikkawa et al. ............ 222/131
4,696,169 A    9/1987 Niemann et al.
4,860,545 A * 8/1989 Zwick et al. ................ 62/50.6
4,932,214 A * 6/1990 Nieratscher et al. ......... 62/50.6
5,403,167 A * 4/1995 Kobayashi et al. .......... 417/461
5,454,697 A * 10/1995 Nakanishi ................ 417/423.3
5,545,015 A    8/1996 Scherrer
5,651,474 A * 7/1997 Callaghan et al. .......... 220/565
6,006,525 A   12/1999 Tyree, Jr.
6,640,554 B2  11/2003 Emmer et al.
2002/0085921 A1* 7/2002 Gram et al. ................... 417/53
2003/0017062 A1* 1/2003 Cowans ....................... 417/366

FOREIGN PATENT DOCUMENTS

DE           19910893         9/2000

* cited by examiner

*Primary Examiner*—William C Doerrler
(74) *Attorney, Agent, or Firm*—McAndrews, Held & Malloy, Ltd.

(57) ABSTRACT

The apparatus comprises a double walled vacuum insulated vessel defining a cryogen space for holding a cryogenic fluid, a pump assembly comprising a pump with a suction inlet disposed within the cryogen space, and at least one elongated member extending from the pump to a drive unit disposed outside the cryogen space. The elongated member comprises an elongated non-metallic section that has a thermal conductivity that is less than that of a structurally equivalent elongated stainless steel member of the same length. In preferred embodiments, the elongated member can be one or both of a drive shaft or a rigid structural member for supporting the pump and holding it in a fixed relationship to the drive unit. The method employs the apparatus to increase hold times for holding cryogenic fluids by reducing heat leak into the cryogen space.

37 Claims, 4 Drawing Sheets

APPARATUS AND METHOD FOR HOLDING A CRYOGENIC FLUID AND REMOVING CRYOGENIC FLUID THEREFROM WITH REDUCED HEAT LEAK

CROSS-REFERENCE TO RELATED APPLICATION(S)

This application is a continuation of International Application No. PCT/CA2004/002166, having an international filing date of Dec. 20, 2004, entitled "Apparatus And Method For Holding A Cryogenic Fluid And Removing Same Therefrom With Reduced Heat Leak". International Application No. PCT/CA2004/002166 claimed priority benefits, in turn, from Canadian Patent Application No. 2,454,458 filed Dec. 24, 2003. International Application No. PCT/CA2004/02166 is hereby incorporated by reference herein in its entirety.

FIELD OF THE INVENTION

The present invention relates to an apparatus and method for holding a cryogenic fluid and removing cryogenic fluid therefrom with reduced heat leak for improved hold times. More particularly, the apparatus comprises a thermally insulated vessel with a pump disposed therein and means for reducing heat leak into the cryogen space through the pump and drive unit assembly.

BACKGROUND OF THE INVENTION

At cryogenic temperatures, a gas can be stored in a storage vessel in liquefied form to achieve a higher storage density compared to the same gas stored in the gaseous phase. Higher storage density is desirable, for example, when the gas is employed as a fuel for a vehicle because the space available to store fuel on board a vehicle can be limited.

Another advantage of storing a gas in liquefied form is lower manufacturing and operating costs for the vessel. For example, storage vessels can be designed to store a liquefied gas at a cryogenic temperature at a saturation pressure less than 2 MPa (about 300 psig). Compressed gases are commonly stored at pressures above 20 MPa (about 3000 psig), but vessels that are rated for containing gases at such high pressures require a structural strength that can add weight and cost to the vessel. In addition, because of the lower storage density of gas stored in the gaseous phase, the size and/or number of vessels must be larger to hold the same molar quantity of gas and this adds to the weight of the storage vessels if the gas is stored in the gaseous phase. Extra weight adds to operational costs if the vessel is used in a mobile application, either for holding a liquefied gas for transporting it, or for holding the gas on board for use as a fuel to be consumed by the vehicle's engine. For the same molar quantity of gas, the weight of the storage vessels for holding the gas at high pressure in the gaseous phase can be two to five times greater than the weight of the storage vessels for holding the same gas at lower pressure in liquefied form.

The desired temperature for storing a liquefied gas depends upon the particular gas. For example, at atmospheric pressure, natural gas can be stored in liquefied form at a temperature of about 113 degrees Kelvin, and a lighter gas such as hydrogen can be stored at atmospheric pressure in liquefied form at a temperature of about 20 degrees Kelvin. As with any liquid, the boiling temperature for the liquefied gas can be raised by holding the liquefied gas at a higher pressure. The term "cryogenic temperature" is used herein to describe temperatures less than 175 degrees Kelvin, at which a given fluid can be stored in liquefied form at pressures less than 2 MPa (about 300 psig). To hold a liquefied gas at cryogenic temperatures, the storage vessel defines a thermally insulated cryogen space.

A problem with storing a liquefied gas at cryogenic temperatures is providing sufficient thermal insulation to prevent heat transfer into the cryogen space. Conventional vessels use a number of techniques for providing thermal insulation for the cryogen space. For example, double-walled vessels are typically employed with an insulating vacuum provided in the space between the outer and inner walls to reduce convective heat transfer. The outer surfaces of the inner and outer walls can also be wrapped with insulating material to reduce radiant heat transfer. The supports for suspending the inner wall within the outer wall can be designed with an extended heat transfer path to reduce conductive heat transfer.

A pump can be employed to remove the liquefied gas from the cryogen space. When a gas is needed for a high-pressure application, it can be more efficient to use a pump to pressurize the liquefied gas before it is vaporized, compared to using a compressor to pressurize the gas after it has been vaporized. A pump designed for pumping a liquefied gas can be disposed inside or outside the cryogen space.

One of the problems with positioning the pump outside of the cryogen space is that the suction pipe leading from the cryogen space to the pump needs to be well-insulated to prevent the liquefied gas from being heated and vaporized prior to being directed to the pump. Vaporization of any amount of the liquefied gas in the suction line can result in reduced efficiency or inoperability of the pump and/or cavitation, which can damage the pump itself.

When a pump is positioned inside the cryogen space, one of the problems is that heat can be transferred through the pump structure into the cryogen space. In industrial applications, storage vessels are typically stationary installations with a volume that is orders of magnitude greater than the volumes typically used for vehicular fuel tanks. With such large stationary storage vessels, the effect of heat leak through the pump structure is not significant. In smaller mobile storage vessels such as those for carrying fuel on board a vehicle, the same amount of heat leak has a greater effect on the hold time because of the greater proportional effect the heat leak has on a smaller amount of liquefied gas. In large industrial storage vessels it is also possible to lengthen the pump assembly to reduce heat leak by providing a longer heat transfer path. For smaller storage vessels, this approach is limited by the size of the vessel.

Yet another method of reducing heat leak into a storage vessel is to employ a smaller pump that is operated at a higher speed, so that, compared to a larger pump, there is a smaller cross sectional area through the pump and that reduces the amount of conductive heat transfer. A pump operating at a higher speed generally requires more net positive suction head ("NPSH") to avoid vaporization and cavitation at the pump suction and inside the pump. In stationary industrial installations, because the storage vessel is generally much larger and is not limited by the same size constraints faced by mobile vessels, a stationary storage vessel can be designed with a depth that provides a higher NPSH, allowing the pump to be operated at higher speeds. For example, a stationary storage vessel can be oriented with a vertical longitudinal axis to increase the available NPSH. With a smaller vessel, and especially a mobile one, the vessel's size and orientation can limit the available NPSH, thereby limiting the speed at which a pump can operate.

Given enough time, heat transfer into a cryogen space will eventually cause the vaporization of some of the liquefied gas that is held within the cryogen space, which in turn causes the pressure within the cryogen space to increase. To relieve this pressure, conventional storage vessels typically employ a pressure relief valve to vent some of the vapor from the storage vessel. It is accepted that some heat transfer into the cryogen space will occur with any design. However, it is desirable to reduce the amount of heat transfer to extend the "hold time", which is defined herein as the length of time a liquefied gas can be held before venting occurs. Longer hold times result in less gas being vented and possibly wasted, more efficient use of energy (since energy is expended to liquefy gases), and for fuel gases like natural gas, this also results in lower emissions fuel into the environment.

SUMMARY OF THE INVENTION

An apparatus and method are provided for holding a cryogenic fluid and removing cryogenic fluid therefrom. The apparatus comprises:
  (a) a double walled vacuum insulated vessel defining a cryogen space for holding a cryogenic fluid;
  (b) a pump assembly comprising a pump with a suction inlet disposed within the cryogen space and at least one elongated member extending from the pump to a drive unit disposed outside the cryogen space, and wherein the elongated member comprises an elongated non-metallic section that has a thermal conductivity that is less than that of a structurally equivalent elongated stainless steel member of the same length.

The structural requirements of the non-metallic member are determined by the function of the elongated member. In specifying that the elongated non-metallic section is structurally equivalent to an elongated metallic member, equivalence is defined herein as being determined by the structural requirements that are necessary for the functionality of the elongated member. Structural properties can include tensile and compressive yield strength as well as stiffness, and "structural strength" is defined herein to include all such structural properties that are required for the between the elongated non-metallic section as a whole and a structurally equivalent metallic section. That is, the non-metallic section can be made from a material that has different structural properties from that of stainless steel as long as the structural properties of the elongated non-metallic section are functionally equivalent to an elongated metallic member of the same length and the elongated non-metallic member has a lower thermal conductivity.

The suction inlet of the pump assembly comprises a one-way inlet valve associated with an end plate covering a distal end of a piston cylinder and a discharge outlet associated with a proximal end of the pump that is opposite to the distal end.

The pump is preferably a double-acting two stage pump comprising:
  a piston reciprocable within a cylinder and operatively connected to the drive shaft;
  a first working chamber defined by a space between the piston and the end plate that covers the distal end;
  a second working chamber defined by an annular space between the piston and an end wall through which the drive shaft extends; and
  a one-way pass-through valve disposed within a fluid passage for allowing fluid flow from the first working chamber to the second working chamber.

The method increases hold time for holding a liquefied gas inside a cryogen space defined by a vessel that has a pump disposed in the cryogen space. The method comprises:
  (a) vacuum insulating the vessel;
  (b) thermally insulating the pump to reduce heat leak into the cryogen space by connecting the pump to a drive unit external to the vessel with an elongated member comprising an elongated non-metallic section that has a thermal conductivity that is less than that of a structurally equivalent elongated stainless steel member of the same length.

According to the method, the elongated member can be one or both of the drive shaft that drives the pump or the rigid structural support for supporting the pump and holding it in a fixed relationship with the drive unit.

BRIEF DESCRIPTION OF THE DRAWINGS

FIGS. 2A and 2B illustrate two embodiments for a structural arrangement for supporting the pump and holding it in fixed relationship to the drive unit.

DETAILED DESCRIPTION OF PREFERRED EMBODIMENT(S)

Figure 1:
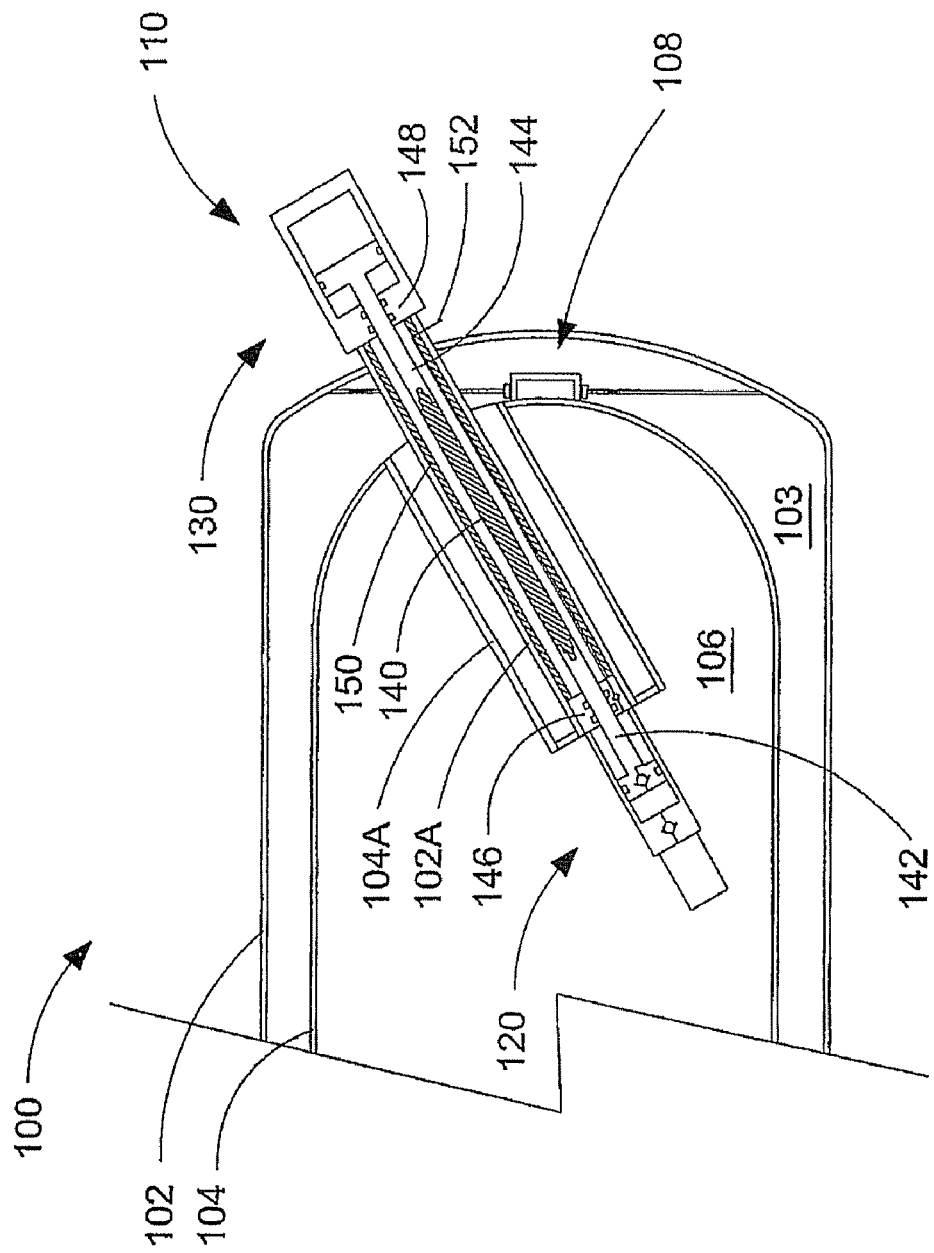
FIG. 1 is a schematic diagram of a storage tank for a liquefied gas with a pump disposed within the cryogen space.

FIG. 1 is a cross section view showing the general arrangement of a portion of an apparatus 100 that comprises a thermally insulated storage vessel and a pump disposed inside the storage vessel. The illustrated storage vessel has a double-walled construction with an outer wall 102 and an inner wall 104. The space between outer wall 102 and inner wall 104 can be evacuated to provide vacuum space 103 for thermally insulating cryogen space 106, defined by the inner surface of inner wall 104. There are a number of known arrangements for supporting inner wall 104 within outer wall 102 and support structure 108 is merely representative of one such arrangement. For mobile storage vessels, the support structure must be able to handle shifts in the loading caused by movement of the vehicle, and the supports must be designed to carry the full dynamic load in both the axial and radial directions.

A double-walled sleeve comprising outer sleeve 104A and inner sleeve 102A extends vacuum space 103 around the shaft portion of pump assembly 110 to provide an extended heat transfer path from the outside environment to cryogen space 106 through pump assembly 110.

The illustrated embodiment of pump assembly 110 comprises double-acting reciprocating piston pump 120 disposed within the cryogen space, drive unit 130 disposed outside of outer wall 102, and elongated drive shaft 140 and a structural member 150, each extending from drive unit 130 to the pump 120. Pump assembly 110 can be equipped with filter 112 at the suction inlet for pump 120 to restrict the size of solid particles that can enter pump 120. Filter 112 can comprise a perforated screen for preventing contaminants or frozen particles from entering the pump. Contaminants can originate, for example, from the manufacturing process or from the fuel introduced into the storage vessel. Frozen particles, for example could comprise frozen carbon dioxide or other compounds that freeze at the temperature of the cryogenic fluid.

Figure 2:
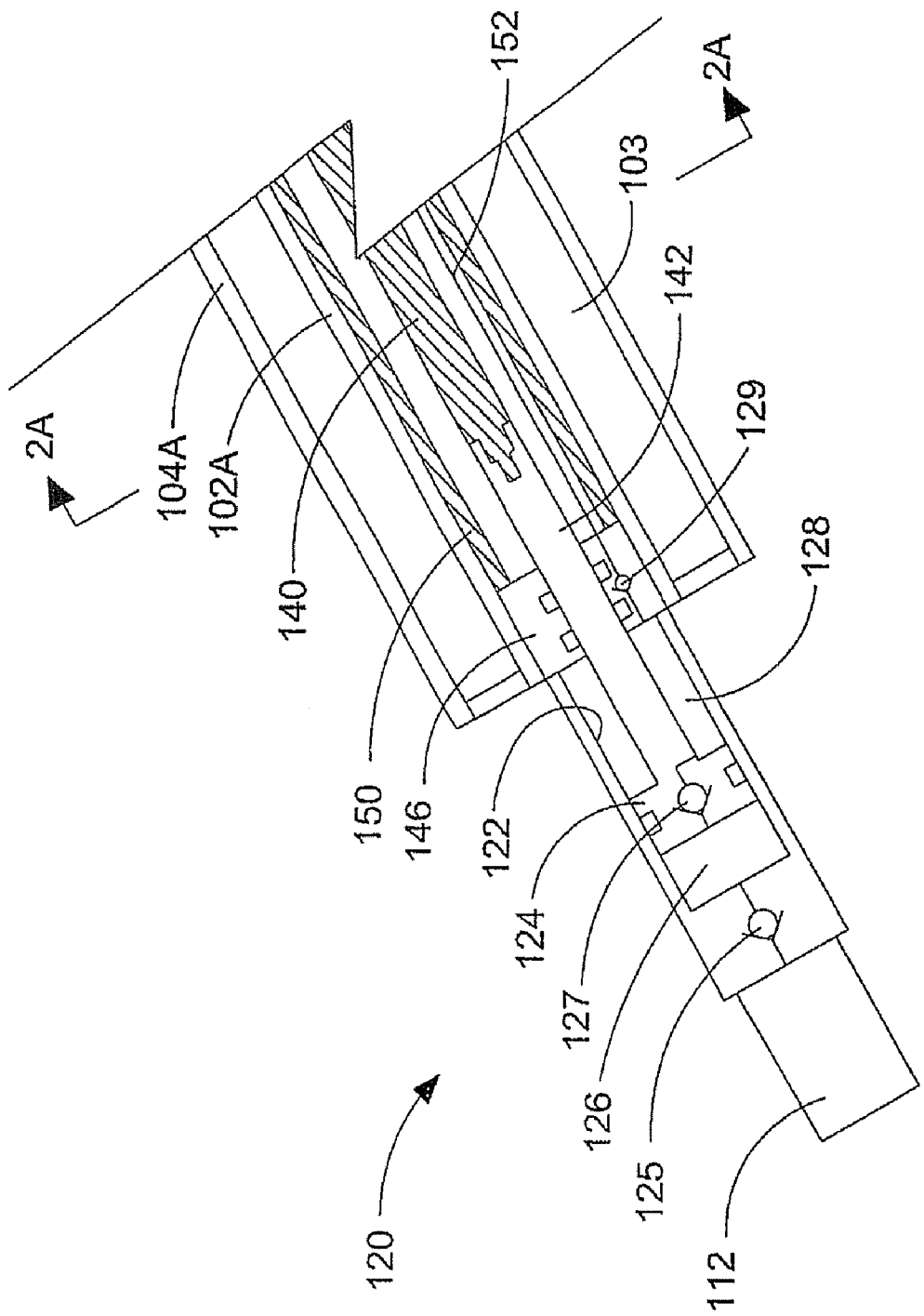
FIG. 2 is an enlarged view of the pump and one end of the drive shaft.

FIG. 2 illustrates the same embodiment shown in FIG. 1, but with an enlarged section view of pump 120 and one end of drive shaft 140. Like reference numerals are employed in different figures to refer to the same feature and if a feature is described with reference to one figure, in the interest of brevity, the same feature may not be described again if depicted in another figure. With reference now to FIG. 2, pump 120 comprises a hollow body, which defines cylinder 122. Piston 124 is operatively connected to drive shaft 140 and is reciprocable within cylinder 122. One-way inlet valve 125 is openable during a retraction stroke (when piston 124 is moving towards the drive end of pump assembly 110) so that liquefied gas can be drawn from cryogen space 106, through the inlet passage, and into first working chamber 126. Simultaneously during the retraction stroke, cryogenic fluid residing in second working chamber is compressed and discharged therefrom through one-way discharge valve 129 and then it flows into discharge conduit 152. During the retraction stroke the fluid pressure in second working chamber 128 is higher than the fluid pressure in first working chamber 126, causing one-way pass-through valve 127 to remain closed. One-way pass-through valve 127 is preferably mounted within the body of piston 124.

During an extension stroke, when piston 124 is moving towards the inlet end (and away from the drive end of pump assembly 110), the pressure in first chamber 126 increases, causing one-way inlet valve 125 to remain closed. Meanwhile the volume of second working chamber 128 is expanding and one-way pass-through valve 127 opens to allow cryogenic fluid to flow from first working chamber 126 into second working chamber 128. Drive shaft 140 extends through second working chamber 128 so that the swept volume of second working chamber 128 is less than the swept volume of first working chamber 126. Consequently, during an extension stroke, more cryogenic fluid flows into second working chamber 128 than can be accommodated by the expanding volume, resulting in compression within second working chamber 128 during the extension stroke and the discharge of some cryogenic fluid through one-way discharge valve 129 and out through discharge conduit 152. This preferred arrangement and method of operation is disclosed in the Applicant's co-owned U.S. Pat. No. 5,884,488. With this arrangement, the pump is operable to discharge cryogenic fluid on both the extension and retraction strokes. If the swept volume of first working chamber 126 is about twice the swept volume of second working chamber 128, about an equal amount of cryogenic fluid is discharged during each piston stoke, reducing pressure pulsations in the conduits downstream from the pump discharge.

With reference again to FIG. 1, the illustrated drive unit is a linear drive operatively connected to drive shaft 140 and matched to the reciprocating movement of pump piston 124. A hydraulic drive is preferred to allow piston 124 to be reciprocated at a constant speed and at a rate that is not coupled to the speed of the engine. In a vehicular application, a hydraulic system is typically already conveniently on-board. In other embodiments, not shown, but well known to persons skilled in the technology involved here, the drive unit could be actuated by other drive means, such as, for example, pneumatically, electrically or mechanically.

Drive shaft 140 preferably comprises an elongated non-metallic section that has a thermal conductivity that is less than that of a structurally equivalent elongated stainless steel member of the same length. For example, the hatched section of drive shaft 140 shown in FIGS. 1 and 2 can be made from such a non-metallic material. For example, compared to metallic materials like stainless steel, a fiber reinforced plastic such as a fiberglass/epoxy material commercially known as G-10 or G-11, has a very low thermal conductivity and has adequate compressive and tensile strength at low temperatures. In preferred embodiments, the elongated non-metallic section has a thermal conductivity that is equal to or less than 3 W/m*K at 100 degrees Kelvin. Table 1 below compares the thermal conductivity and tensile yield strength of G-10 to 304L stainless steel. Even though G-10 has a tensile yield strength that is less than 304L stainless steel, because the thermal conductivity is much lower, an elongated member made from G-10 with a larger cross-sectional area can still have a lower thermal conductivity than a structurally equivalent stainless steel member.

TABLE 1

| Material | Property (Units) | Temperature (Degrees Kelvin) | |
| --- | --- | --- | --- |
| | | 100 | 273 |
| G-10 or G-11 | Thermal Conductivity (W/m*K) | 0.26 | 0.55 |
| | Tensile Yield Strength (MPa) | 300-400 | 300-400 |
| 304L Stainless Steel | Thermal Conductivity (W/m*K) | 9.2 | 13.4 |
| | Tensile Yield Strength (MPa) | 1300 | 1183 |

Bearings 146 and 148 are provided at each end of drive shaft 140 to support, guide and seal against drive shaft 140. In preferred embodiments, such as the one illustrated in FIG. 1, the drive shaft comprises metallic members at end portions 142 and 144, which provide smooth metallic bearing surfaces. Compared to a drive shaft made entirely from composite materials, a drive shaft with metallic end portions is preferred for better wear resistance, hardness, and machinability to achieve the desired surface smoothness for supporting and sealing the drive shaft. The metallic end portions are preferably made from a material with suitable structural and thermal conductivity properties at cryogenic temperatures. Some metals like carbon steel are not suitable because they become relatively brittle at cryogenic temperatures. Stainless steel, Invar 36, and other alloys with a high nickel content are examples of preferred structural materials for the subject cryogenic apparatus because such materials remains ductile at cryogenic temperatures, can provide the requisite structural strength, and have a relatively low thermal conductivity compared to other metals that might be structurally suitable, such as, for example, aluminum-bronze alloys or brass.

In the enlarged view of FIG. 2, a preferred arrangement for joining the elongated non-metallic section to metallic end portion 142 is shown. The end of the elongated non-metallic section has a stepped mating surface that is matched to a complementary stepped hole provided in the end of metallic end portion 142. An adhesive can be employed to bond the two pieces together and the stepped mating surface transfers the load more evenly over the cross section of the drive shaft, than would be the case if a constant-diameter mating surface were employed. Other means for joining the elongated non-metallic section to the metallic end portions are known to persons skilled in this technology, such as one or more pins, threads, or a collar. In some embodiments a combination of joining techniques can be employed. For example, adhesives and pins can both be employed to join the non-metallic section to the metallic end portions.

If the elongated non-metallic section has a material strength that is greater than that of the metallic end portions, for reduced thermal conductivity, the non-metallic section can have a cross sectional area that is less than that of metallic end portions 142 and 144. For example, the non-metallic section can be hollow and have the same diameter as the metallic end portions, or it can be solid and have a smaller diameter than the metallic end portions. Conversely, if the elongated non-metallic section has a material strength that is less than that of the metallic end portions, it can have a larger cross sectional area to provide structural equivalence as long as the thermal conductivity of the non-metallic material is low enough such that the thermal conductivity of the non-metallic section as a whole is less than a structurally equivalent elongated stainless steel member.

As with drive shaft 140, elongated structural member 150, shown with a hatched cross section in FIGS. 1 and 2 can also be made from a non-metallic material such that structural member 150 has a thermal conductivity that is less than that of a structurally equivalent elongated stainless steel member of the same length. Structural member 150 provides a structure for supporting pump 120 in a fixed relationship with drive unit 130. Pump 120 and drive unit 130 are preferably attached to opposite ends of structural member 150. That is, elongated structural member 150 preferably extends the full distance from pump 120 to drive unit 130 as shown in FIG. 1.

Figure 2B:
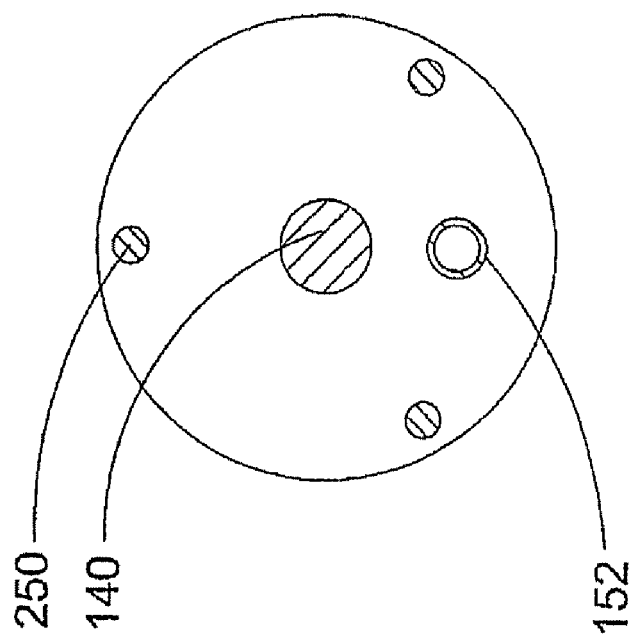
FIGS. 2A and 2B are transverse cross section views along the longitudinal axis of the drive shaft viewed at section line 2A in FIG. 2.
Figure 2A:
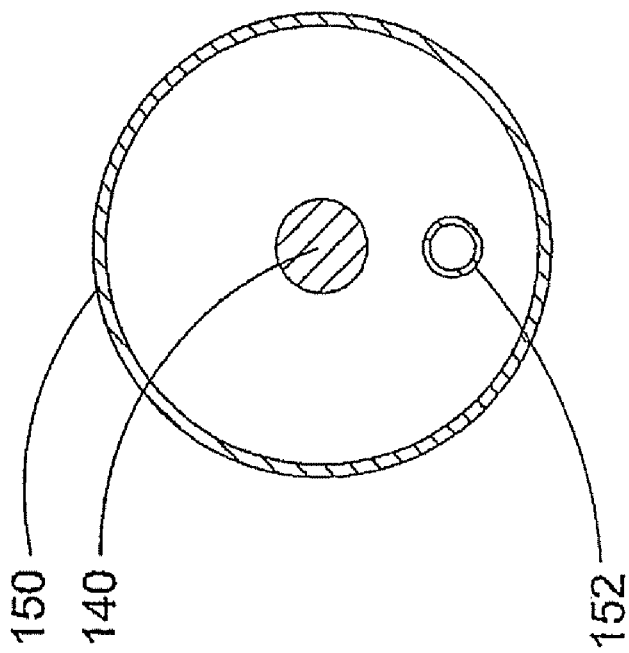

As shown in FIG. 2A, in a preferred embodiment, structural member 150 can be a hollow member so that drive shaft 140 and conduit 152 can extend through the hollow center. In the illustrated embodiment structural member 150 has a transverse cross section with a circular shape, but other cross sectional shapes can also be employed. In still other embodiments, instead of a single hollow structural member, a plurality of solid or hollow structural members can extend from pump 120 to drive unit 130 to maintain a fixed distance there between, while providing an open space through which a drive shaft can be inserted. FIG. 2B shows a transverse cross section view that shows drive shaft 140, conduit 152 and elongated structural members 250 shown as solid rods in this example. As with the other embodiments, to reduce heat leak into the cryogen space through pump assembly 110, structural members 250 can be made from a non-metallic material.

In preferred embodiments the elongated non-metallic member, such as a section of the drive shaft or the structural member, can be made from a composite material comprising fibers disposed within a plastic matrix. Those skilled in the knowledge of composite materials will understand that it is possible to choose from many types of fibers and plastics and that the choice of materials determines the properties of the composite material. In the present case, two important properties for the composite material are structural strength and thermal conductivity under the anticipated operating conditions. For example, under the anticipated operating conditions the apparatus will be subjected to fluids at cryogenic temperatures and the non-metallic material cannot become brittle at anticipated operating temperatures.

An objective of using a non-metallic composite material is to reduce heat leak into the cryogen space. Accordingly, it is desirable for the composite member to have a lower thermal conductivity than structurally equivalent ferrous members used in conventional drive shafts, which are typically made from stainless steel for cryogenic devices. Even if the heat transfer coefficient of a composite material is less than metallic materials such as stainless steel, the overall thermal conductivity can be greater if the composite material does not have adequate structural strength. That is, a composite structural member with an inadequate material strength can necessitate a larger heat conducting cross-sectional area that results in higher overall thermal conductivity compared to a structurally equivalent metallic member made from stainless steel. Therefore, a combination of structural strength and a low heat transfer coefficient is needed to achieve the desired result. In preferred embodiments the non-metallic structural member has a thermal conductivity that is less than a substitute structurally equivalent shaft member made from stainless steel.

Composite materials for the non-metallic structural shaft member can comprise fibers selected from the group consisting of glass, carbon, synthetic fibers made from a resin, and quartz. An example of a synthetic fiber made from a resin would be aramid fibers such as the material sold by E.I. DuPont de Nemours and Company under the trade name Kevlar®. An epoxy resin can be employed to provide the plastic matrix. In other embodiments the plastic matrix can comprise bismaleimide or a thermoplastic selected from the group consisting of polyetheretherketone and polyphenylene sulfide.

While randomly oriented fibers can be employed, because the structural shaft member requires strength principally in the axial direction, fibers with controlled orientation can be employed for improved stiffness and structural strength in the axial direction. For example, woven fiber mats or continuous oriented strands can be employed to ensure that at least a minimum number of the fibers are aligned to provide more strength in the axial direction.

The fibers and plastic materials for a composite material can also be chosen to provide a component that weighs less than conventional metallic components. Lower weight is advantageous for the drive efficiency since less power is needed to drive a pump with a lighter drive shaft. In addition, for a mobile apparatus, lighter weight is desirable even if the benefits are only marginal.

Figure 3:
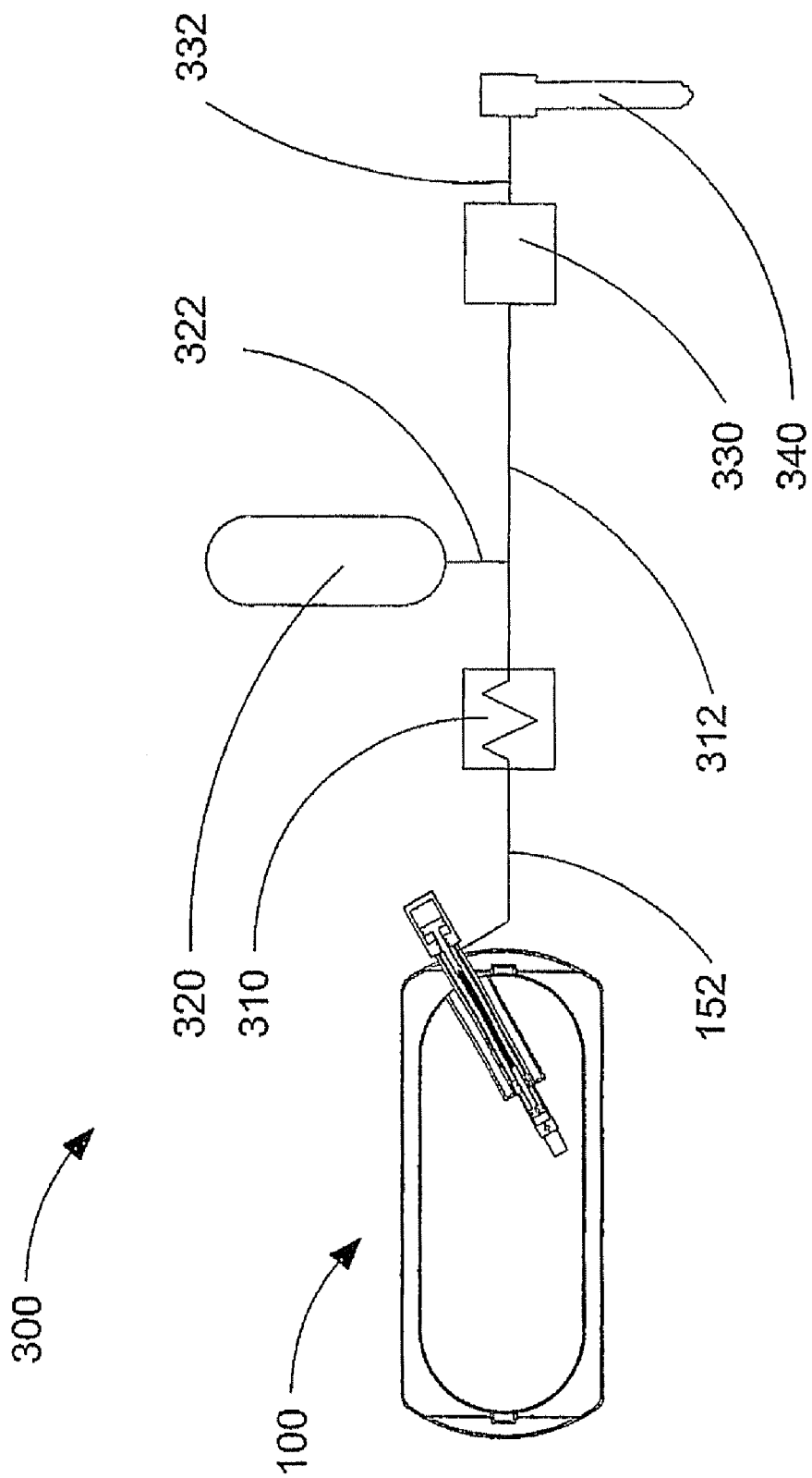
FIG. 3 is a schematic diagram of a fuel supply system for an internal combustion engine, wherein such a system is a particularly suitable application for the present method and apparatus.

As already indicated, a particularly beneficial application for apparatus 100 is mobile installations. One reason for this is that in a mobile application there can be constraints on the size of the storage vessel, and for a smaller vessel heat leak into the cryogen space can be more significant that the same amount of heat leak into a larger vessel. FIG. 3 is a schematic diagram of vehicular fuel system 300 that stores liquefied fuel gas on board to be supplied as fuel to the engine. Apparatus 100 is the same as the apparatus of FIG. 1 and the liquefied fuel gas is discharged from the pump through discharge conduit 152. The liquefied gas is vaporized in vaporizer 310 and flows in the gaseous phase at high pressure through conduit 312. Vehicular fuel system 300 can employ accumulator tank 320, in fluid communication with conduit 312 via conduit 322. Accumulator tank 320 is a pressure vessel for ensuring that the engine is adequately supplied with fuel in the gaseous phase and at sufficient pressure. Fuel conditioning module 330 comprises a pressure-regulating device for controlling the pressure of the gaseous fuel that is delivered to fuel injection valve 340 through conduit 332. Vehicular fuel system 300 can be used with any vehicle that consumes a gaseous fuel, but apparatus 100 is particularly efficient and useful for delivering gas at pressures higher than 20 MPa, and so a particularly suitable application for vehicular fuel system 300 is for a so-called direct injection engine where the gaseous fuel is injected directly into the combustion chamber.

In other embodiments, not shown, the pump can be a single acting piston pump, another type of positive displacement pump, or a pump that uses a rotating shaft such as a centrifugal pump. The same advantages of the present arrangement can be achieved with the disclosed drive shaft and/or structural arrangement, and it makes no difference if the drive shaft reciprocates or rotates.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. An apparatus for holding a cryogenic fluid and removing same therefrom, said apparatus comprising:
   (a) a double walled vacuum insulated vessel defining a cryogen space for holding said cryogenic fluid;
   (b) a pump assembly comprising a pump with a suction inlet disposed within said cryogen space and at least one elongated member extending from said pump to a drive unit disposed outside said cryogen space, and wherein said elongated member comprises an elongated non-metallic section that has a thermal conductivity that is less than that of a structurally equivalent elongated stainless steel member of the same length; and
   (c) a conduit comprising one end disposed within said cryogen space and connected to a discharge outlet of said pump assembly and another end outside said cryogen space.

2. The apparatus of claim 1 wherein said apparatus is installable on a mobile vehicle.

3. The apparatus of claim 2 wherein said double-walled vacuum insulated vessel is a fuel tank mountable on a vehicle and said cryogenic fluid is a liquefied fuel gas that can be supplied as fuel to an engine of said vehicle.

4. The apparatus of claim 1 wherein said elongated non-metallic section has a thermal conductivity less than or equal to 3 W/m*K at 100 degrees Kelvin.

5. The apparatus of claim 1 wherein said elongated member is a drive shaft operatively connected at one end to said pump and at an opposite end to said drive unit.

6. The apparatus of claim 5 wherein said elongated non-metallic section is made from a composite material comprising fibers disposed within a plastic matrix.

7. The apparatus of claim 5 wherein said pump is a reciprocating piston pump.

8. The apparatus of claim 5 wherein said elongated non-metallic section is hollow.

9. The apparatus of claim 5 wherein said drive shaft comprises at least two metallic bearing surfaces and said elongated non-metallic section extends between said two metallic bearing surfaces.

10. The apparatus of claim 9 wherein said elongated non-metallic section has a smaller transverse cross sectional area than the transverse cross sectional area at said metallic bearing surfaces.

11. The apparatus of claim 9 wherein said elongated non-metallic section is bonded to said metallic bearing surfaces with a stepped mating surface.

12. The apparatus of claim 9 wherein at least one pin is employed to connect said elongated non-metallic section to each one of said metallic bearing surfaces.

13. The apparatus of claim 9 wherein said metallic bearing surfaces are stainless steel.

14. The apparatus of claim 1 wherein said elongated member is a hollow body that provides a rigid structural support for said pump, wherein a drive shaft can extend from said drive unit to said pump along the axis of said hollow body.

15. The apparatus of claim 14 wherein said elongated non-metallic section of said hollow body extends the full distance from said drive unit to said pump.

16. The apparatus of claim 14 wherein said elongated non-metallic section is made from a composite material comprising fibers disposed within a plastic matrix.

17. The apparatus of claim 16 wherein said fibers are selected from the group consisting of glass, carbon, synthetic fibers made from a resin, and quartz.

18. The apparatus of claim 16 wherein said plastic matrix comprises an epoxy resin.

19. The apparatus of claim 16 wherein said plastic matrix comprises bismaleimide.

20. The apparatus of claim 16 wherein said plastic matrix comprises a thermoplastic selected from the group consisting of polyetheretherketone and polyphenylene sulfide.

21. The apparatus of claim 14 wherein said pump is a reciprocating piston pump.

22. The apparatus of claim 21 wherein said suction inlet comprises a one-way inlet valve associated with an end plate covering a distal end of a piston cylinder and a discharge outlet associated with a proximal end of said pump that is opposite to said distal end.

23. The apparatus of claim 22 wherein said pump is a double-acting two stage pump comprising:
   a piston reciprocable within a cylinder and operatively connected to said drive shaft;
   a first working chamber defined by a space between said piston and said end plate that covers said distal end;
   a second working chamber defined by an annular space between said piston and an end wall through which said drive shaft extends; and
   a one-way pass-through valve disposed within a fluid passage for allowing fluid flow from said first working chamber to said second working chamber.

24. The apparatus of claim 23 wherein said one-way pass-through valve is mounted within said piston.

25. The apparatus of claim 23 wherein said first working chamber has a swept volume that is about twice that of said second working chamber.

26. A method of increasing hold time for holding a liquefied gas inside a cryogen space within a vessel that comprises a pump disposed in said cryogen space, said method comprising:
   (a) vacuum insulating said vessel;
   (b) thermally insulating said pump to reduce heat leak into said cryogen space by connecting said pump to a drive unit external to said vessel with an elongated member comprising an elongated non-metallic section that has a thermal conductivity that is less than that of a structurally equivalent elongated stainless steel member of the same length.

27. The method of claim 26 wherein said non-metallic structural member is a composite made by disposing fibers in a plastic matrix.

28. The method of claim 27 wherein said fibers are selected from the group consisting of glass, carbon, synthetic fibers made from a resin, and quartz.

29. The method of claim 27 wherein said plastic matrix comprises epoxy resin.

30. The method of claim 27 wherein said plastic matrix comprises bismaleimide.

31. The method of claim 27 wherein said plastic matrix comprises a thermoplastic selected from the group consisting of polyetheretherketone and polyphenylene sulfide.

32. The method of claim 26 wherein said pump is a reciprocating piston pump.

33. The method of claim 26 wherein said elongated member is a drive shaft.

34. The method of claim 33 further comprising joining each end of said elongated non-metallic section to a metallic member comprising a smooth bearing surface for supporting said drive shaft.

35. The method of claim 34 further comprising making said metallic members from stainless steel.

36. The method of claim 26 wherein said elongated member is a rigid structural support for said pump.

37. The method of claim 26 wherein said elongated non-metallic section has a thermal conductivity less than or equal to 3 W/m*K at 100 degrees Kelvin.

* * * * *